(12) United States Patent
Rieger et al.

(10) Patent No.: US 10,207,547 B2
(45) Date of Patent: Feb. 19, 2019

(54) SHIELD-SHAPED SIDE-WALL PROTECTION ELEMENT AND PROTECTIVE DEVICE FOR A VEHICLE TIRE

(71) Applicant: Erlau AG, Aalen (DE)

(72) Inventors: Johannes Werner Rieger, Oberkochen (DE); Daniel Urban, Heidenheim (DE)

(73) Assignee: ERLAU AG, Aalen (DE)

( * ) Notice: Subject to any disclaimer, the term of this patent is extended or adjusted under 35 U.S.C. 154(b) by 410 days.

(21) Appl. No.: 14/904,156

(22) PCT Filed: Jul. 11, 2014

(86) PCT No.: PCT/EP2014/064926
§ 371 (c)(1),
(2) Date: Jan. 11, 2016

(87) PCT Pub. No.: WO2015/004269
PCT Pub. Date: Jan. 15, 2015

(65) Prior Publication Data
US 2016/0152096 A1   Jun. 2, 2016

(30) Foreign Application Priority Data
Jul. 12, 2013   (DE) .................... 20 2013 103 113 U (51) Int. Cl.
*B60C 13/00*   (2006.01)
*B60C 13/04*   (2006.01)
(Continued)

(52) U.S. Cl.
CPC .............. *B60C 13/002* (2013.01); *B60B 7/01* (2013.01); *B60B 7/04* (2013.01); *B60B 7/02* (2013.01);
(Continued)

(58) Field of Classification Search
CPC ..... B60C 13/00; B60C 13/001; B60C 13/002; B60C 13/003; B60C 13/02; B60C 13/023; B60C 13/04
See application file for complete search history.

(56) References Cited

U.S. PATENT DOCUMENTS 1,905,674 A   4/1933   Babbs
3,545,516 A * 12/1970   Albert .................... B60C 27/02
                                                    152/213 R
(Continued)

FOREIGN PATENT DOCUMENTS

EA        018310 B1   7/2013
EP    0007981 A1      2/1980
(Continued)

*Primary Examiner* — Justin R Fischer
(74) *Attorney, Agent, or Firm* — The Webb Law Firm (57) ABSTRACT

The invention relates to a shield-shaped side-wall protection element for a vehicle tire and to a protective device for vehicle tires. In order to provide a side-wall protection element for vehicle tires that can optimally protect a tire side wall under rough conditions, that can be produced economically, and is easy to install, the invention provides a shield-shaped side-wall protection element for a vehicle tire, comprising a radially inner base, an outer edge, which forms the radially outer end and which extends in a circumferential direction, and with a shield segment, which extends from the outer edge at least to the base, wherein the outer edge is at least partially offset axially inward from the base). The protective device for vehicle tires according to the invention comprises a plurality of shield-shaped side-wall protection elements arranged overlapping in the manner of shingles in a circumferential direction.

19 Claims, 3 Drawing Sheets

(51) Int. Cl.
*B60B 7/01* (2006.01)
*B60B 7/04* (2006.01)
B60B 7/02 (2006.01)

(52) U.S. Cl.
CPC ... *B60B 2900/212* (2013.01); *B60B 2900/321* (2013.01); *B60B 2900/331* (2013.01); *B60B 2900/551* (2013.01); *B60B 2900/721* (2013.01)

(56) References Cited

U.S. PATENT DOCUMENTS

| | | |
|---|---|---|
| 4,111,250 A | 9/1978 | Bauer |
| 4,252,169 A | 2/1981 | Watts |
| 4,319,618 A | 3/1982 | Suzuki |
| 4,576,214 A * | 3/1986 | Preusker ............... B60C 27/045 152/213 A |
| 4,790,362 A | 12/1988 | Price |
| 6,905,177 B1 | 6/2005 | Murillo |
| 8,770,670 B2 | 7/2014 | Chester et al. |
| 8,876,222 B2 | 11/2014 | Seradarian et al. |
| 2009/0315389 A1 | 12/2009 | Seradarian et al. |
| 2013/0033093 A1 | 2/2013 | Santana |

FOREIGN PATENT DOCUMENTS

| | | |
|---|---|---|
| EP | 2338694 A1 | 6/2011 |
| GB | 511056 | 8/1939 |
| GB | 796002 | 6/1958 |
| WO | 2008092185 A1 | 8/2008 |

* cited by examiner

SHIELD-SHAPED SIDE-WALL PROTECTION ELEMENT AND PROTECTIVE DEVICE FOR A VEHICLE TIRE

CROSS-REFERENCE TO RELATED APPLICATIONS

This application is the United States national phase of PCT International Application. No. PCT/EP2014/064926 filed Jul. 11, 2014, and claims priority to German Patent Application No. 202013103113.5, filed Jul. 12, 2013, the disclosure of each of which is hereby incorporated by reference in its entirety.

BACKGROUND OF THE INVENTION

Field of the Invention

The invention relates to a shield-shaped side-wall protection element for a vehicle tire. The invention further relates to a protective device for vehicle tires.

Side-wall protection elements serve to protect the side walls of vehicle tires against mechanical damage such as caused by sharp-edged boulders or other elements that may cause damage to the tire side wall. In the mining sector, particularly in surface mining, vehicles such as large dump trucks often move though areas where sharp-edged material is a danger to the tires. Any protection fully enclosing a tire, such as protection chains, is not desirable for such vehicles because they reduce vehicle speed and increase fuel consumption. It is for this reason therefore necessary to protect only the side walls of the tires. Known side protection elements are configured, for example, as annular discs which are attached to a wheel rim and at least partially cover the tire side wall. Annular disks being made of one piece there have the drawback that a force acting upon the annular disk in one spot can lead to deformations of the entire annular disk. The annular disk, when acted upon by force, can in particular deflect away from the vehicle tire, so that the tire side wall is at this point no longer protected.

It is therefore an object of the invention to provide a side-wall protection element for vehicle tires that can optimally protect a tire side wall even under harsh conditions and that can be produced economically and is easy to install.

This object is according to the invention satisfied by an aforementioned shield-shaped side-wall protection element for a vehicle tire, comprising a radially inner base, with an outer edge which forms the radially outer end and which extends in a circumferential direction, and a shield segment which extends from the outer edge at least to the base, where the outer edge is at least partially offset axially inward from the base.

The axial offset inwardly of at least a portion of the outer edge from the base ensures that a load acting radially inwardly does not lead to the side-wall protection element moving away from the tire side wall. Such a load occurs, for example, when the vehicle tire moves across boulders and the side-wall protection element with its outer edge strikes an object such as a stone.

For the above-mentioned protective device for vehicle tires, the object of the invention is satisfied by a protective device for vehicle tires comprising a plurality of shield-shaped side-wall protection elements according to the invention arranged overlapping in the manner of shingles in a circumferential direction.

A protective device which is composed of a plurality of shield-shaped side-wall protection elements prevents that a load acting upon one of the side-wall protection elements is transferred to all other side-wall protection elements. The shingled overlap also ensures optimum coverage of the tire side wall to be protected.

The solution according to the invention can be further improved by various embodiments that are advantageous on their own and can be combined at random. These embodiments and the advantages associated therewith shall be described below.

SUMMARY OF THE INVENTION

In some examples, a shield-shaped side-wall protection element is provided for a vehicle tire, comprising a radially inner base, with an outer edge which forms a radially outer end and which extends in a circumferential direction, and with a shield segment which extends from said outer edge to at least said base, wherein said outer edge is at least partially offset axially inward from said base.

Also provided is a protective device for vehicle tires, comprising a plurality of shield-shaped side-wall protection elements as set forth herein, arranged in an overlapping, shingles manner in a circumferential direction.

BRIEF DESCRIPTION OF THE DRAWINGS

The foregoing summary, as well as the detailed description, will be better understood when read in conjunction with the appended drawings. The present invention is described herein in greater detail using an embodiment and associated drawings. In the drawings.

DETAILED DESCRIPTION

According to a first advantageous embodiment, the shield segment can in a protective position, as compared to an initial position, be deflected axially inwardly when subjected to a load acting radially inwardly upon the outer edge. The shield segment, when subjected to a load acting radially inwardly, can be deflected in the direction toward the tire side wall, so that it comes to lie in front of or onto the latter in a protective manner. This reduces damage to the tire side wall, for example, when driving over boulders. The axial offset of the outer edge inwardly from the base there serves to have the shield segment move in the direction toward the tire side wall and not away from the tire side wall.

According to a further advantageous embodiment, the base can comprise a fastening segment for attaching the side-wall protection element on a support, and a deformation zone can be provided between the fastening segment and the outer edge and extend from an end in the circumferential direction being in front to a rear end being disposed in the direction opposite to the circumferential direction, and exhibiting increased resilient deformability as compared to the remaining side-wall protection element. A load directed radially inwardly toward the outer edge, as occurring, for example, when driving over an object such as a stone, can lead to a movement of the shield segment in the direction toward the tire side wall. The deformation zone is then comparable to the fulcrum of a lever, while the part of the side-wall protection element, in particular the shield segment located between the deformation zone and the outer edge, at the same time represents the lever arm of force as well as the load arm and is pivotable about the deformation zone. Since the base and thereby the deformation zone are offset axially outwardly from the outer edge, a force being directed radially inwardly always has a component which is directed perpendicular to the imaginary arm, which is represented by the side-wall protection element, in the direction of the tire side wall. A torque therefore acts upon the side-wall protection element that can lead to pivoting at least a portion of the side-wall protection element about the deformation zone. The deformation zone therefore acts as a hinge. A portion of the side-wall protection element, preferably the shield segment, can therefore be pivoted toward the tire side wall to protect it.

Alternatively or simultaneously, the shield segment can at least partially be made of resiliently deformable material. The deformation zone can comprise the shield segment. The fastening segment then acts as a fixed bearing for the remaining side-wall protection element which is offset axially outwardly from the outer edge. If a load directed radially inwardly now acts upon the outer edge, then, as described above, a torque acts upon the side-wall protection element. This torque can then act upon the side-wall protection element as a bending moment, so that the side-wall protection element, in particular the shield segment, is bent in the direction toward the tire side wall.

The deformation zone can be resiliently deformable both in the radial and in the axial direction. In addition to the resilient deflection of the inner surface axially inwardly, impacts directed radially inwardly can thereby also be absorbed.

In order to achieve a high degree of deformability of the deformation zone, the deformation zone can at least partially be formed from different material than the remaining side-wall protection element.

According to a further advantageous embodiment, the deformation zone can comprise at least one weakened area having a cross-sectional area transverse to the circumferential direction and/or transverse to the axial direction that is reduced as compared to vicinal areas. The cross-sectional area can be reduced perpendicular to the circumferential direction as compared to vicinal areas, so that the side-wall protection element exhibits reduced material thickness in the weakened area. Alternatively or additionally, the cross-sectional area can be reduced perpendicular to the axial direction as compared to vicinal areas. This reduction can be formed, for example, by flat recesses in the deformation zone. The weakened area allows for easy production of a deformation zone. In addition, the deformability of a deformation zone can be adjusted via the cross-sectional areas.

Simultaneous use of the pivotability of at least of a portion of the side-wall protection element about the deformation zone in the direction of the tire side wall and bending of the side-wall protection element towards the tire side wall, where the fastening segment acts like a fixed bearing, can be achieved in that the side-wall protection element is essentially made of resiliently deformable material, where the deformation zone exhibits increased deformability as compared to the remaining side-wall protection element. A load directed radially inwardly upon the outer edge then simultaneously leads to pivoting a portion of the side-wall protection element in the direction towards the tire side wall as well as to bending the portion of the side-wall protection element located between the deformation zone and the outer edge in the direction of the tire side wall, since the torque acting due to the load leads to both pivoting about the deformation zone as well as to bending due to the bending moment generated in the side-wall protection element.

In order to increase the tendency of the side-wall protection element to deflect the shield segment axially inward in the direction toward the tire side wall when a load acts radially inwardly upon the outer edge, the base can comprise a fastening segment for mounting the side-wall protection element to a support and a projection projecting axially outwardly between the fastening segment and the outer edge. The projection represents an additional offset outwardly in the axial direction, so that the pivoting described above of a portion of the side-wall protection element in the direction toward the tire side wall is enhanced.

In order to further increase the tendency of the side-wall protection element to pivot the shield segment in the direction toward the tire side wall when a load is directed radially inwardly upon the outer edge, as well as to further reduce the risk that the side-wall protection element moves axially away from the tire side wall when a load is directed radially inwardly upon the outer edge, the base can in the region of the projection have a substantially V- or U-shaped cross-section, the bottom of which faces axially outwardly. When a load acting radially inwardly occurs, the two legs of the V- or U-shaped profile can move toward each other. Since the bottom of the profile faces axially outwardly, the remaining side-wall protection element extending radially outwardly from the projection is during such a motion pivoted axially inwardly in the direction toward the tire side wall. In addition, the profile represents a spring element for absorbing impact that is directed radially inwardly.

The shield segment can from the projection extend radially outwardly. The projection can be located in the deformation zone. The shield segment is then pivotally mounted at the projection and the transition region from the shield segment to the projection acts like a hinge. To obtain a particularly stable side-wall protection element, the projection can extend throughout from the end in the circumferential direction being in front to the end in the circumferential direction being at the rear.

To increase movability or pivotability, respectively, of the shield segment about the projection, the projection can be discontinuous. In addition, the side-wall protection element can at the projection, in particular at the transition from the shield segment to the projection, exhibit reduced material thickness as compared to the remaining side-wall protection element. If the projection and/or the transition from the shield segment to the projection exhibits increased deformability as compared to the remaining side-wall protection element, then these areas are part of the weakened area of the deformation zone.

In order to achieve uniform spacing of the inner surface to a tire side wall, the shield segment can comprise an inner surface that is at least in sections concave and faces axially inwardly. The inner surface can at least in sections be concave in both the radial direction as well as in the circumferential direction.

According to a further advantageous embodiment, the inner surface can form a receiving capacity in which the flexing zone of a vehicle tire can in the assembled state be accommodated without deflection. Vehicle tires generally form outwardly curved flexing zones in the area of the tire tread surface. These flexing zones can therefore be accommodated in the receiving capacity without the bending of the flexing zone causing any deflection of the side-wall protection element. Vehicle tires are commonly standardized according to industry standards. The flexing zones occurring during operation and their dimensions are generally known. The receiving capacity can therefore be adapted for a particular type of tire.

According to a further advantageous embodiment, the side-wall protection element can at least in sections be formed as being axially outwardly convex. Due to the outwardly convex shape, the action of a force directed radially inwardly upon a portion of the side-wall protection element that is formed outwardly convex can also effect a deflection of the inner side in the direction of the tire side walls. Due to the rounded shape, objects, such as boulders, can advantageously be deflected at the outer side of the side-wall protection element. Together with the concave inner surface, a concave-convex shape can therefore arise in which the bulge extends axially outwardly.

To increase the stability of a side-wall protection element for a given material thickness, the shield segment can in the fastening segment at least in the axial direction exhibit increased flexural rigidity as compared to the side-wall protection element. In addition thereto, the flexural rigidity can in the radial direction be increased in the fastening segment as compared to the remaining side-wall protection element.

It can due to the bead be achieved that the side-wall protection element remains bendable but is under the action of a load directed radially inwardly not so strongly bent that the function of the side-wall protection element is impaired.

The flexural rigidity in the axial direction can be increased in that the shield segment comprises at least one bead with a radially extending bead longitudinal axis. The flexural rigidity in the circumferential direction can be increased in that the shield segment comprises at least one bead with a bead longitudinal axis extending in the circumferential direction.

According to a further advantageous embodiment, the side-wall protection element can comprise a front overlapping region pointing in a rolling direction and a rear overlapping region pointing in the direction opposite to the rolling direction, where the front overlapping region is axially inwardly offset from the rear overlapping region. The off-set allows several side-wall protection elements to be disposed successively in the rolling direction so that the respective front overlapping region in the rolling direction overlaps a rear overlapping region of a side-wall protection element which in a rolling direction is the subsequent one. The front overlapping region can there be arranged substantially in the axial direction between a tire side wall to be protected and the rear overlapping region of a side-wall protection element which in a rolling direction is the subsequent one. Due to the overlap, a protective area extending continuously in a circumferential direction can be formed. To ensure sufficient overlap and at the same time low material consumption, the rear overlapping region can in a direction opposite to the rolling direction further project beyond the fastening segment than the front overlapping region does in the rolling direction.

According to a further advantageous embodiment, at least one recess can from one end pointing in the rolling direction at least extend in the direction of the base and/or at least one recess can extend from an end pointing in a direction opposite to the rolling direction at least in the direction of the base. The recesses can prevent canting of two adjacently mounted side-wall protection elements in the region of the deformation zone. In addition, the recesses can allow loose objects, such as stones, which have entered into an area between the tire side wall and the inner surface, to leave this area.

The above-mentioned protective device for vehicle tires can according to a first advantageous embodiment be improved in that the side-wall protection elements are with their fastening segments attached to an annular holding element encircling an axis of the vehicle tire and arranged parallel to the tire side wall. The annular holding element allows mounting side-wall protection elements following the circumferential direction. The annular holding element can preferably be fastened to a rim of the tire and represents a support for the side-wall protection elements.

In order to allow loose objects that are in the assembled state of the protective device located between the protective device and the tire side wall to fall out, the protective device can comprise at least one axially extending outlet opening between two vicinal side-wall protection elements which is formed by at least one recess of at least one of the side-wall protection elements.

In order to obtain an effective outlet opening without compromising the protective effect of the protective device, at least one outlet opening can in the radial direction be defined by the annular holding element and by the overlapping regions of the side-wall protection elements.

The invention is below explained in more detail by way of example using an embodiment with reference to the drawings. The feature combinations illustrated in the embodiment by way of example can subject to the above explanations be added other features according to the properties of the side-wall protection element of the invention required for a particular application. Individual features can also subject to the above explanations be omitted in the embodiment described when the effect of this feature in a specific case of application is irrelevant.

Figure 2:
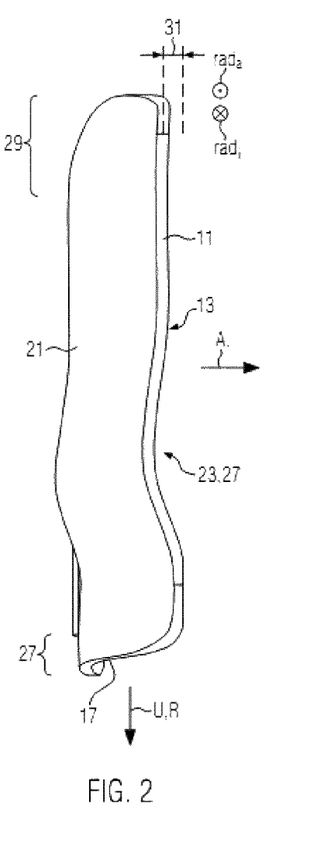
FIG. 2 shows a plan view directed radially inwardly of the side-wall protection element shown in FIG. 1.
Figure 3:
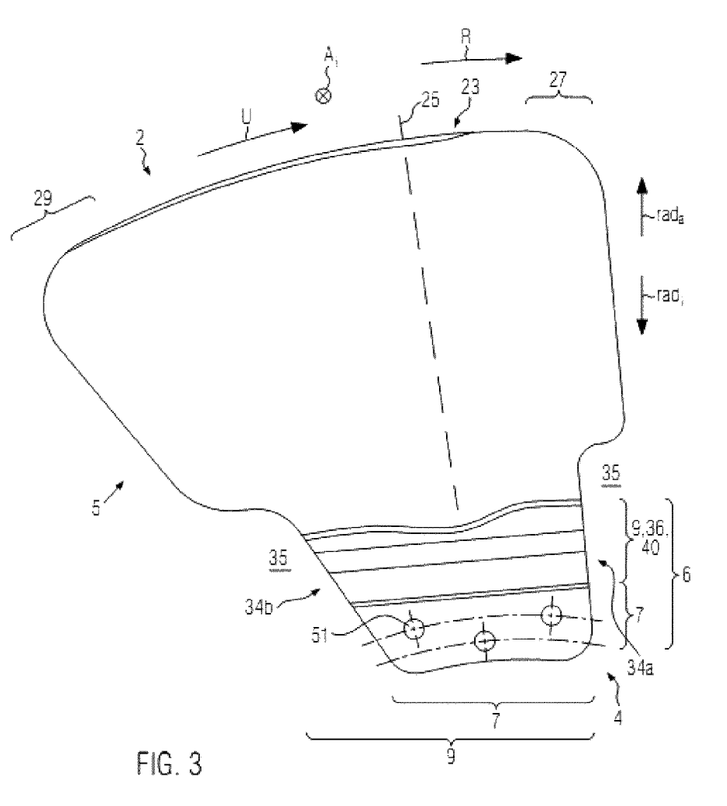
FIG. 3 shows a schematic view in the axial direction of the side-wall protection element of the same embodiment.

The structure of a side-wall protection element 1 according to the invention is first described with reference to FIGS. 1 to 3 which show the same embodiment in different views. Reference numerals have for the sake of clarity been selected for the directions, which are based on a vehicle tire.

Figure 1:
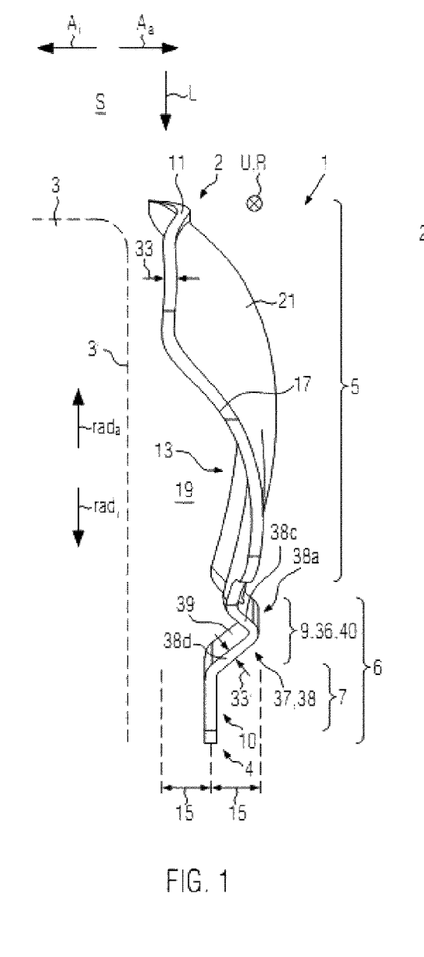
FIG. 1 shows a schematic side view of a side-wall protection element according to the invention parallel to the circumferential direction.

A vehicle tire 3 is only indicated in FIG. 1. The axial inner direction $A_i$ and the axial outer direction $A_a$ always extend parallel to a wheel axis of vehicle tire 3. The axial inner direction $A_i$ faces vehicle tire 3, the axial outer direction $A_a$ faces away from it.

The radial inner direction $rad_i$ faces radially toward the wheel axis, the radial outer direction $rad_a$ runs in the opposite direction.

Side-wall protection element 1 comprises a radial outer end 2, a base 6 and a shield segment. 5 disposed there between. Radial outer end 2 is formed by outer edge 11. Base 6 is offset axial outwardly from outer edge 11 in the axially outer direction $A_i$. Base 6 comprises a fastening segment 7 disposed radially inwardly and a deformation zone 9 disposed between shield segment 5 and fastening segment 7. Fastening segment 7 can act like a fixed bearing 10 for side-wall protection element 1. Side-wall protection element 1 has an outer edge 11 disposed radially outwardly and extending in the circumferential direction U. Outer edge 11 adjoins shield segment 5 and defines it radially outwardly. Outer edge 11 can simultaneously represent a portion of shield segment 5. Outer edge 11 is preferably curved along the circumferential direction U.

Fastening segment 7 extends substantially radially when viewed in the circumferential direction U. Fastening segment 7 can comprise openings 12, which penetrate side-wall protection element 1 in the radial direction and serve to have fastening elements passed therethrough.

The side-wall protection element comprises an inner surface 13. Inner surface 13 extends from fastening segment 7 radially outwardly along the radial outer direction rad$_a$. In an assembled state, inner surface 13 faces the direction toward vehicle tire 3 along the axial inner direction A$_i$. In a force-free initial position S, inner surface 13 can be spaced from vehicle tire 3. An offset 15 exists, at least in the initial position S, between outer edge 11 and fastening segment 7. Outer edge 11 is there offset at least partially axially inwardly from fastening segment 7.

Inner surface 13 in the region of the shield segment has a concave bulge 17. Concave bulge 17 extends in the radial direction. Alternatively, inner side 13 can additionally have a concave bulge (not shown) along the circumferential direction U. Concave inner surface 13 can form a receiving capacity 19 in which a flexing zone (not shown) of vehicle tire 3 can be accommodated without there deflecting inner surface 13 of side-wall protection element 1. The size of occurring flexing zones is known, since in particular vehicle tires manufactured in the industrial sector according to industry standards are used with defined tire pressures. Bulge 17 of inner side 13 can be manufactured for a particular use, or type of tire, respectively. Side 21 of side-wall protection element 1 facing radially outwardly is in the region of shield segment 5 formed convex toward the outside. Shield segment 5 therefore has a convex-concave shape in the radial direction.

To increase the flexural rigidity in the axial direction Ai, Aa as compared to remaining side-wall protection element 1, shield segment 5 comprises a bead 23. Bead 23 has a bead longitudinal axis 25 extending radially. Bead 23 of the embodiment has a wave-like profile 27. Alternatively, other known bead profiles, such as, inter alia, semi-circular beads, box beads or trapezoidal beads can be used. The use of multiple beads is also possible. If increased flexural rigidity is desired also along the circumferential direction U, then shield segment 5 can comprise additional beads, the bead longitudinal axes of which extend substantially relative to the circumferential direction U.

Side-wall protection element 1 can comprise a front overlapping region 27 pointing in a rolling direction R and a rear overlapping region 29 pointing in the direction opposite to the rolling direction. Front overlapping region 27 is by offset 31 in the axially inner direction A$_i$ offset from rear overlapping region 29. Offset 31 can there in particular correspond to at least one material thickness 33. Front overlapping region 27 can in the rolling direction directly adjoin wave-shaped bead 23. Rear overlapping region 29 projects in the direction opposite to the rolling direction R further beyond fastening segment 7 than front overlapping region 27 does in the rolling direction.

Recesses 35 and 35' extend in the radial inner direction rad$_i$ from front overlapping region 27 and from rear overlapping region. Recess 35 there extends in the direction opposite to the rolling direction R onto deformation zone 9 and recess 35' extends in the rolling direction R onto deformation zone 9.

Deformation zone 9 extends substantially straight-lined and tangential to the circumferential direction U between the end 34a in the circumferential direction U being in front and the end 34b in the circumferential direction U being at the rear. Deformation zone 9 exhibits increased deformability as compared to remaining side-wall protection element 1. It can at least partially be formed from a different material than the remaining side-wall protection element. Deformation zone 9 has a weakened area 36 with the material thickness 33 being reduced as compared to the remaining material thickness 33'.

Deformation zone 9 exhibits increased deformability than remaining side-wall protection element 1. The deformability can there in both the radial and the axial directions be increased. In the embodiment shown, deformation zone 9 comprises projection 40. Projection 40 projects axially outwardly and has a substantially V-shaped profile 38 that in cross-section is transverse to the circumferential direction U. Concave inner surface 39 of deformation zone 9 there faces axially inwardly and bottom 38a of V-shaped section 38 axially outwardly.

The task and the function of deformation zone 9 as well as other elements of side-wall protection element 1 shall be explained below: A load L acting radially inwardly upon outer edge 11 generates a torque, where shield segment 5 simultaneously represents the work arm and the lever arm of force. Since deformation zone 9 exhibits increased deformability as compared to remaining side-wall protection element 1, and base 6 is offset axially outwardly from outer edge 11, the torque leads to a bending moment within deformation zone 9 that is increased as compared to remaining side-wall protection element 1. Deformation zone 9 then flexes more than the remaining side-wall protection element 1 and shield segment 5 is pivoted about deformation zone 9 in the direction toward tire side wall 3'. Deformation zone 9 then acts like a hinge, the axis of which extends in the circumferential direction U. Projection 40 creates an additional offset 15'. The imaginary lever therefore extends from outer edge 11 up to bottom 38a. The two legs 38c and 38d of V-shaped profile 38 can move in the radial direction (rad$_i$ rad$_a$) toward each other which increases the tendency of side-wall protection element 1 to pivot shield segment 5 in the direction toward tire side wall 3'. If side-wall protection element 1, in particular shield segment 5, is made from resiliently deformable material, then the torque causes a bending moment also in shield segment 5, whereby bending of shield segment 5 in the direction toward tire side wall 3 occurs in addition to the pivoting about deformation zone 9. Both motions lead to the displacement of inner surface 13 in the axial inner direction A. Deformation zone 9 can due to its resilient deformability in the radial direction also absorb impacts directed radially inwardly onto outer edge 11.

If a load L does not act directly upon outer edge 11, but in the axial direction outwardly offset upon convexly bulging outer side 21, then this load also leads to the deflection of inner side 13 in the axial inner direction A$_i$. Convexly bulging outer surface 21 also allows objects to be deflected from outer side 21. Bead 23 reduces compression in the radial direction of shield segment 5 when load L is active.

The configuration of side-wall protection element 1 therefore, as described above, leads to the fact that side-wall protection element 1 with its inner surface 13 moves in the direction toward a tire side wall 3' and thereby protects it when load L acts radially inwardly. Inner surface 13 can there at least partially bear against tire side wall 3'. Due to the above-described configuration and function of side-wall protection element 1 according to the invention, the risk, when the action of force L is directed radially inwardly, can therefore be reduced or even ruled out that side-wall protection element 1 moves away from tire 3, whereby the latter would be unprotected.

Figure 4:
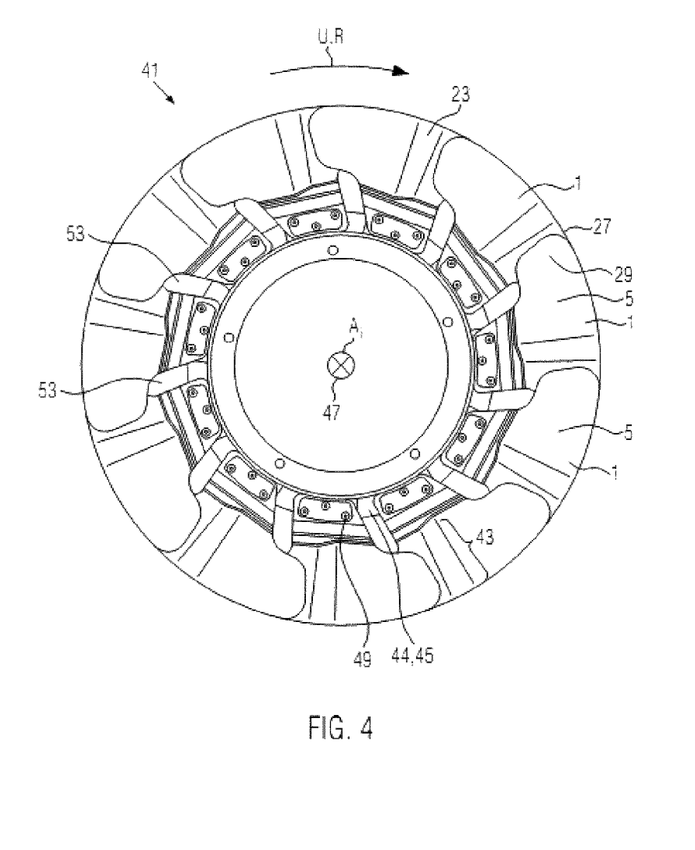
FIG. 4 shows a protective device, being composed of side-wall protection elements according to the embodiment shown, in an axial plan view.

FIG. 4 shows a plan view in the axial inner direction onto a protective device 41 according to the invention. Protective device 41 comprises a plurality of side-wall protection elements 1 according to the invention that extend along the circumferential direction U and there overly overlap in the manner of shingles. The front overlapping region 27 is respectively located in the axial inner direction $A_i$ behind a rear overlapping region 29 of a side-wall protection element 1 arranged in the circumferential direction U as being the subsequent one. Rear overlapping regions 29 extend in the direction opposite to the circumferential direction U up to bead 23 of side-wall protection element 1 that it overlaps. Shield segments 5 thereby form a protective area 43 that is continuous in the circumferential direction U. Since respective shield segments 5 are not firmly connected to each other, deflection or deformation of one of the shield segments 5 does not affect all further side-wall protection elements 1 of protective device 41.

Individual protective elements 1 are each with their fastening segment 7 attached to a support 44 being formed by an annular holding element 45. Holding element 45 extends annularly in an equidistant manner about a tire axis 47. It is preferably attached to a wheel rim Fastening elements 49, such as screws, can be used for attaching fastening segments 7 to holding element 45. In this case, fastening segments 7 comprise openings 12 which can be penetrated by fastening elements 49. In order to achieve particularly high stability of the attachment and to avoid the deformation of side-wall protection element 1 in fastening segment 7, openings 12 can be arranged offset from one another in the radial direction.

The protective device comprises outlet openings 53 extending in the axial direction through protective device 41. Outlet openings 53 are arranged in an area between two side-wall protection elements 1. The outlet openings are in the radial direction defined by annular holding element 45 and overlapping regions 27, 29.

Outlet openings 53 are formed by recesses 35, 35'. Outlet openings 53 allow objects, such as stones entering between protective area 43 and a tire side wall, to again drop out in order to avoid damage to the tire side wall or inner surfaces 13 of side-wall protection elements 1. Outlet openings 53 additionally prevent canting of two adjacent side-wall protection elements 1 in the region of deformation zones 9.

REFERENCE NUMERALS 1 side-wall protection element
2 radial outer end
3 vehicle tire
3' tire side wall
5 shield segment
6 base
7 fastening segment
9 deformation zone
10 fixed bearing
11 outer edge
12 opening
13 inner surface
15, 15' offset
17 bulge
21 outer side
19 receiving capacity
23 bead
25 bead longitudinal axis
27 front overlapping region
29 rear overlapping region
31 offset
33, 33' material thickness
34a, 34b ends in the circumferential direction
35, 35' recesses
36 weakened area
37 spring element
38 v-shaped profile
38a bottom
38c, 38d leg
39 inner side
40 projection
41 protective device
43 protective area
44 support
45 holding element
47 tire axis
49 fastening element
53 outlet opening
U circumferential direction
R rolling direction
$A_i$ axial inner direction
$A_a$ axial outer direction
$rad_a$ radial outer direction
$rad_i$ radial inner direction
S initial position
L load

The invention claimed is:

1. A shield-shaped side-wall protection element for a vehicle tire, comprising a radially inner base, with an outer edge which forms a radially outer end and which extends in a circumferential direction, and with a shield segment which extends from said outer edge to at least said base, wherein said outer edge is at least partially offset axially inwardly from said base, and
    wherein the protection element further comprises a deformation zone, the deformation zone being configured such that the shield segment is deflected axially inwardly when subjected to a load acting radially inwardly upon the outer edge.

2. The shield-shaped side-wall protection element according to claim 1, wherein said base further comprises a fastening segment for attaching said side-wall protection element to a support,
    and further wherein the deformation zone is provided between said fastening segment and said outer edge, wherein the deformation zone extends from an end in the circumferential direction being in front toward a rear end being disposed in the direction opposite to said circumferential direction, and wherein the deformation zone exhibits increased resilient deformability as compared to said remaining side-wall protection element.

3. The shield-shaped side-wall protection element according to claim 2, wherein said deformation zone further comprises at least one weakened area having a cross-sectional area transverse to the circumferential direction and/or transverse to an axial direction ($A_i$, $A_a$) that is reduced as compared to vicinal areas.

4. The shield-shaped side-wall protection element according to claim 1, wherein said base further comprises a fastening segment for attaching said side-wall protection element to a support and a projection facing axially outwardly between said fastening segment and said outer edge.

5. The shield-shaped side-wall protection element according to claim 4, wherein said base in the region of said projection has a substantially V- or U-shaped cross-section, and further wherein bottom of the substantially V- or U-shaped cross-section of said base faces axially outwardly.

6. The shield-shaped side-wall protection element according to claim 4, wherein said shield segment extends radially outwardly from said projection.

7. The shield-shaped side-wall protection element according to claim 1, wherein said shield segment further comprises an inner surface that is at least in sections concave and faces axially inwardly.

8. The shield-shaped side-wall protection element according to claim 1, wherein said shield segment further comprises at least one bead with a radially extending bead longitudinal axis.

9. The shield-shaped side-wall protection element according to claim 1, further comprising a front overlapping region pointing in a rolling direction and a rear overlapping region pointing in a direction opposite to said rolling direction, wherein said front overlapping region is axially inwardly offset from said rear overlapping region.

10. The shield-shaped side-wall protection element according to claim 9, wherein said rear overlapping region pointing in the direction opposite to the rolling direction projects further beyond said fastening segment than said front overlapping region does in said rolling direction.

11. The shield-shaped side-wall protection element according to claim 9, further comprising one or more recesses, wherein at least one recess from one end pointing in the rolling direction extends at least in the direction toward said base, and/or at least one recess from an end pointing in a direction opposite to said rolling direction extends at least in the direction toward said base.

12. A protective device for vehicle tires, comprising a plurality of shield-shaped side-wall protection elements arranged in an overlapping, shingles, manner, and in a circumferential direction,
wherein each protection element comprises a radially inner base, with an outer edge which forms a radially outer end and which extends in a circumferential direction, and with a shield segment which extends from said outer edge to at least said base, wherein said outer edge is at least partially offset axially inwardly from said base.

13. The protective device according to claim 12, wherein said side-wall protection elements comprise fastening segments, and wherein the fastening segments are attached to an annular holding element encircling an axis of said vehicle tire and arranged parallel to said tire side wall.

14. The protective device according to claim 12, further comprising at least one axially extending outlet opening between two vicinal side-wall protection elements which is formed by at least one recess of at least one of said side-wall protection elements.

15. The protective device according to claim 14, wherein at least one outlet opening is in a radial direction ($rad_i$, $rad_a$) defined by said annular holding element and by said overlapping regions of the shield-shaped side-wall protection elements.

16. A shield-shaped side-wall protection element for a vehicle tire, comprising a radially inner base, with an outer edge which forms a radially outer end and which extends in a circumferential direction, and with a shield segment which extends from said outer edge to at least said base, wherein said outer edge is at least partially offset axially inwardly from said base,
wherein said base further comprises a fastening segment for attaching said side-wall protection element to a support and a projection facing axially outwardly between said fastening segment and said outer edge, and
wherein said base in the region of said projection has a substantially V- or U-shaped cross-section, and further wherein bottom of the substantially V- or U-shaped cross-section of said base faces axially outwardly.

17. The shield-shaped side-wall protection element according to claim 16, wherein said shield segment extends radially outwardly from said projection.

18. The shield-shaped side-wall protection element according to claim 16, wherein a deformation zone is provided between said fastening segment and said outer edge, wherein the deformation zone extends from an end in the circumferential direction being in front toward a rear end being disposed in the direction opposite to said circumferential direction, and wherein the deformation zone exhibits increased resilient deformability as compared to said remaining side-wall protection element.

19. The shield-shaped side-wall protection element according to claim 16, wherein the deformation zone comprises said projection.

* * * * *

UNITED STATES PATENT AND TRADEMARK OFFICE
CERTIFICATE OF CORRECTION

PATENT NO.         : 10,207,547 B2
APPLICATION NO.    : 14/904156
DATED              : February 19, 2019
INVENTOR(S)        : Johannes Werner Rieger et al.

Page 1 of 1

It is certified that error appears in the above-identified patent and that said Letters Patent is hereby corrected as shown below:

On the Title Page

Item (57) ABSTRACT, Line 12, delete "base)." and insert -- base. --

Signed and Sealed this
Thirtieth Day of April, 2019

Andrei Iancu
*Director of the United States Patent and Trademark Office*